(No Model.)
F. ROBERTSON.
BUNDLE FEEDER FOR THRASHING MACHINES.
No. 493,296. Patented Mar. 14, 1893.
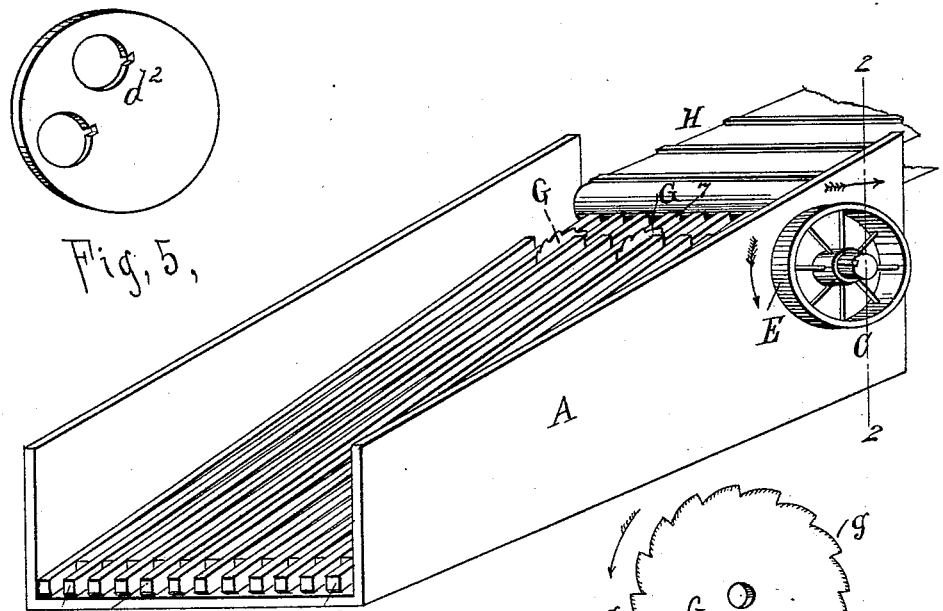
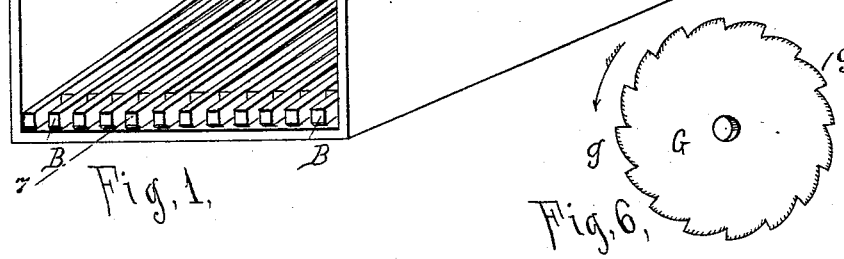
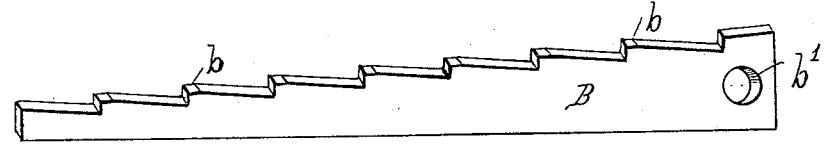
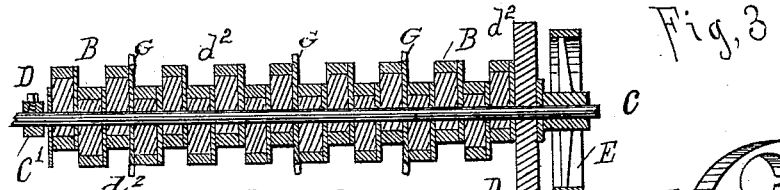
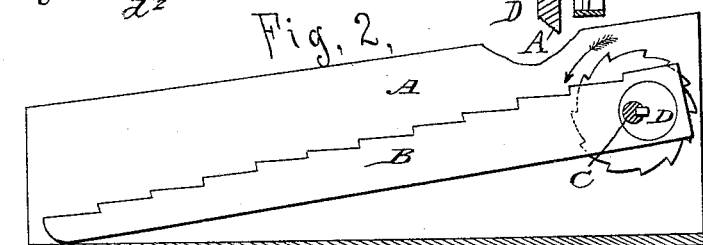
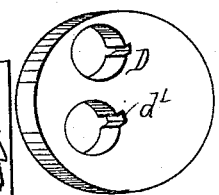
Witnesses,
Thos. M. Cochrane
Tad A. Bailey
Inventor.
Frank Robertson,
by N. DuBois his Atty.

UNITED STATES PATENT OFFICE.

FRANK ROBERTSON, OF LOAMI, ILLINOIS, ASSIGNOR OF ONE-HALF TO ANDREW J. RUNYAN, OF SAME PLACE.

BUNDLE-FEEDER FOR THRASHING-MACHINES.

SPECIFICATION forming part of Letters Patent No. 493,296, dated March 14, 1893.

Application filed March 9, 1892. Serial No. 424,260. (No model.)

*To all whom it may concern:*

Be it known that I, FRANK ROBERTSON, a citizen of the United States, residing at Loami, in the county of Sangamon and State of Illinois, have invented a new and useful Bundle-Feeder for Thrashing-Machines, of which the following is such a full, clear, and exact description as will enable those skilled in the art to make and use my said invention.

The purposes of my invention, are to provide means for conveying automatically to the thrasher the bundles of grain thrown upon the bundle feeder from a wagon, or a stack, to provide means for cutting the band while it is being so conveyed, to provide means whereby the waste of shattered grain may be obviated, and to provide means for so connecting the several parts of the mechanism that the machine as a whole shall be durable, safe and effective in operation, and easily taken apart and put together when it may be necessary to repair the machine. These purposes I accomplish by the mechanism shown in the accompanying drawings, in which:

Figure 1— is a perspective view of the complete machine. Fig. 2— is an enlarged partial transverse section on the line 2 of Fig. 1. Fig. 3— is an enlarged detached view of one of the reciprocating feeder bars. Fig. 4— is an enlarged detached view of one of eccentrics. Fig. 5— is an enlarged detached view of one of the washers, and Fig. 6— is an enlarged detached view of the knife. Fig. 7 — is a vertical longitudinal section on the line 7 of Fig. 1.

Similar letters in all the views indicate similar parts.

The box A is rectangular and at its upper end is deeper than at its lower end. Near the upper end of the box is a transverse shaft C having its bearings in the sides of the box or otherwise suitably supported thereon. Either a round, a square, or other convenient form of shaft may be used. I prefer to use a round shaft as shown provided with a longitudinal key way to accommodate a key by means of which the eccentrics and the washers may be secured to the shaft. A pulley E is secured to the shaft C and is driven by a belt F connecting it with a pulley on the thrashing machine in a manner well known. The eccentric D clearly shown in Fig. 4 has a hole $d$ adapted to fit on the shaft C and a key way $d'$ adapted to receive a key securing the eccentric to the shaft. The feeder bars B, one of which is clearly shown in Fig. 3 are tapering in form, their lower ends being narrower than their upper ends. Near the upper end of each bar is a hole $b'$ adapted to fit around the periphery of the eccentric D, each bar is also provided with serrations $b$, which engage with the bundle of grain placed on the reciprocating feeder bars and assist in propelling the bundles of grain along the bars B and into the thrashing machine. Any number of the bars B may be used, and the width of the box may be varied to conform to the number of bars used.

The bars B and the eccentric D are arranged in series on the shaft C as shown in Fig. 2, and between each pair of adjacent eccentrics is placed a thin washer $d^2$. The washers $d^2$ are eccentric in form, as shown in Fig. 5 and their diameter is greater than that of the eccentrics D so that the washers extend beyond the periphery of the eccentrics D and slightly separate the feeder bars B as shown in Fig. 2. The washers $d^2$ are very thin in order to separate the bars B just enough to prevent binding of the bars, but not enough to permit shattered grain to fall through between the bars.

One or more circular knives G are secured to and rotate with the shaft C between the bars B and at convenient distances apart. Where the knives are placed between contiguous bars, the washers between those bars are omitted.

The knives G, which serve to cut the bands as the bundles pass through the feeder are provided with reversed or backwardly sloping teeth $g$, and these teeth are serrated as shown in Fig. 6.

If a square or hexagonal shaft C, be used the key-way and key may be dispensed with, and the holes in the eccentrics, the knife, and the washers may be made to conform to the shaft. The lower end of the bars B slide upon the bottom of the box A.

Near the outer end of the shaft C is a collar C' provided with a set screw, by means of which the shaft may be adjusted in the bearings so as to prevent end wise movement of the shaft.

A draper H of ordinary construction which need not be described here conveys the bundle to the reciprocating feeder bars B.

The eccentrics and the washers are provided with two or more holes so that they may be placed on the shaft so as to adjust the throw of the eccentrics as may be desired.

In assembling the machine one end of the shaft C is inserted through its bearings in the side of the box A a washer $d^2$ is placed on the shaft then an eccentric D is inserted in the opening $b'$ of the bars and the eccentric supporting the bar is placed on the shaft, then another washer and so on until a sufficient number of eccentrics, washers and bars have been assembled to fill the space between the sides of the box, the shaft is then adjusted in its bearings and the machine is ready for operation.

What I claim as new, and desire to secure by Letters Patent, is—

1. In a bundle feeder for thrashing machines a tapering feeder bar provided with serrations on its upper edge, and having at its wide end a transverse hole adapted to receive an eccentric by means of which said feeder bar is operated in combination with mechanism for imparting to said feeder bar for a reciprocating movement as set forth and for purpose stated.

2. In a bundle feeder for thrashing machines the combination of the box, the transverse shaft supported on the box, the series of contiguous eccentrics secured on said shaft, and the parallel feeder bars supported on said eccentrics and having at their wide ends transverse holes in which said eccentrics revolve, as set forth and for the purpose stated.

3. In a bundle feeder for thrashing machines the combination of the box, the transverse shaft supported on the box, the eccentrics on the shaft, the feeder bars supported on the eccentrics and the washers interposed between and projecting beyond the peripheries of the eccentrics and separating the feeder bars as set forth and for the purpose stated.

4. In a bundle feeder for thrashing machines the combination of the box, the transverse shaft supported on the box and provided with a longitudinal key way, the eccentrics adapted to key on the shaft, the tapering feeder bars having serrations on their upper edges and provided with a hole adapted to fit around the periphery of the eccentric, the washers interposed between the eccentrics, and the circular knives on the shaft, as set forth and for the purpose stated.

5. In a bundle feeder for thrashing machines, the combination of the box, the transverse shaft supported on the box, the collar, the pulley the circular knives, the eccentric, and the washers on the shaft and the reciprocating feeder bars having their lower ends adapted to slide on the bottom of the box and their upper ends supported on the eccentrics as set forth and for the purpose stated.

FRANK ROBERTSON.

Witnesses:
W. A. NEAL,
W. A. JOY.